United States Patent
Hilmer

(10) Patent No.: US 7,705,271 B2
(45) Date of Patent: Apr. 27, 2010

(54) FLEXIBLE SURFACE HEATING ELEMENT, PARTICULARLY FOR SEAT HEATERS, AND METHOD FOR PRODUCING A FLEXIBLE HEATING ELEMENT

(75) Inventor: Josef Hilmer, Gruendau (DE)

(73) Assignee: I.G. Bauerhin GmbH, Gruendau (DE)

( * ) Notice: Subject to any disclaimer, the term of this patent is extended or adjusted under 35 U.S.C. 154(b) by 238 days.

(21) Appl. No.: 11/581,313

(22) Filed: Oct. 16, 2006

(65) Prior Publication Data
US 2008/0099458 A1    May 1, 2008

(30) Foreign Application Priority Data
Oct. 19, 2005    (DE) ................. 10 2005 050 459

(51) Int. Cl.
*H05B 1/00* (2006.01)
(52) U.S. Cl. .............. 219/217; 219/202; 219/546; 219/548
(58) Field of Classification Search ........... 219/217, 219/515, 529, 528, 545, 212, 548, 549, 552, 219/202, 546, 489, 482; 428/58, 196
See application file for complete search history.

(56) References Cited

U.S. PATENT DOCUMENTS

| | | | |
|---|---|---|---|
| 3,864,160 A * | 2/1975 | Davidoff | 428/196 |
| 4,538,054 A * | 8/1985 | de la Bretoniere | 219/545 |
| 4,581,522 A * | 4/1986 | Graham | 219/545 |
| 5,503,887 A * | 4/1996 | Diaz et al. | 428/58 |
| 5,824,996 A * | 10/1998 | Kochman et al. | 219/529 |
| 6,475,935 B1 * | 11/2002 | Ishizaki et al. | 442/188 |
| 6,957,525 B2 * | 10/2005 | Verstraeten et al. | 57/238 |
| 6,977,360 B2 * | 12/2005 | Weiss | 219/545 |
| 7,041,943 B2 * | 5/2006 | Michelmann | 219/545 |
| 7,064,299 B2 * | 6/2006 | Green et al. | 219/515 |
| 7,173,223 B2 * | 2/2007 | Kuo et al. | 219/529 |

FOREIGN PATENT DOCUMENTS

| | | |
|---|---|---|
| DE | 40 20 580 A1 | 6/1990 |
| DE | 41 01 290 C2 | 1/1991 |
| DE | 41 24 684 A1 | 7/1991 |
| DE | 41 42 774 A1 | 12/1991 |
| DE | 43 12 622 A1 | 4/1993 |
| DE | 102 06 336 A1 | 2/2002 |

* cited by examiner

*Primary Examiner*—Tu B Hoang
*Assistant Examiner*—Vinod D Patel
(74) *Attorney, Agent, or Firm*—Karl F. Milde, Jr.; Eckert Seamans Cherin & Mellott, LLC

(57) ABSTRACT

A flexible surface heating element, particularly for seat heaters, having a heating field of conductive fibers electrically connected to at least one contact strip. The contact strip contains a portion of conductors in the form of steel filaments and a portion of conductors in the form of filaments of a higher conductivity than that of the steel filaments. The two types of conductors are electrically interconnected and affixed by means of a yarn on a textile band, the conductors of higher conductivity extending above and/or under the steel filament conductors and being electrically connected to the steel filament conductors. A method for producing the flexible heating element is also provided.

19 Claims, 3 Drawing Sheets

FLEXIBLE SURFACE HEATING ELEMENT, PARTICULARLY FOR SEAT HEATERS, AND METHOD FOR PRODUCING A FLEXIBLE HEATING ELEMENT

BACKGROUND OF THE INVENTION

The present invention relates to a flexible surface heating element, particularly for seat heaters, comprising a heating field of conductive fibers electrically connected to at least one contact strip.

Furthermore, the present invention relates to a method for producing a flexible surface heating element, particularly a flexible surface heating element for seat heaters, comprising a heating field of conductive fibers, particularly carbon fibers, electrically connected to at least one contact strip.

It is common practice to heat seats in automotive vehicles electrically. This is generally realized by the measure that a heating interlayer is introduced between the seat core, which consists of foam or fiber material, and the cover. This heating interlayer is connected via a cable connection to the on-board electrical system of the automotive vehicle. An electrical conductor is heated by the power flow and outputs heat to the surface of the seat. Temperature regulation or temperature control is normally performed by means of electronic control devices that either sense the temperature by means of a temperature sensor additionally introduced into the heating system and keep the temperature constant by switching the power supply on and off, or they limit the supplied power by means of a timer control.

A special configuration of such a surface heating element consists of two opposed contact strips that generally consist of metallic conductors and have the function to supply electric power to the heating conductors which extend from contact strip to contact strip. This is accomplished in that the heating conductors intersect the contact conductors and are mechanically pressed against them, whereby an electrical contact is established. This creates a parallel connection of the heating conductors, the heating power being adjustable by selecting the electrical conductance values of the heating conductors.

Such surface heating elements are known from DE 4142774 A1 and DE 4020580 A1. According to DE 4142774 A1 the heating conductors run in a sinusoidal shape as weft threads over stitch threads of a knitted base material and, at least at the maxima of the amplitudes, are incorporated into the stitches of the textile base material. Power supply conductors are arranged at right angles to the sine axis as contact strips on mutually opposed pattern repeat edges, and each heating conductor is electrically conductively connected to each contact conductor. In one embodiment, a filament of carbon fibers can be used as the heating conductor. According to DE 4020580 A2 a planar electrical heating element consists of a net-type looped fabric incorporating heating conductors and contact conductors connected to the ends of the heating conductors. The heating conductors run essentially parallel to one another and are firmly bonded at intervals into the looped composite of the textile looped fabric in such a way that their path is loop- or wave-shaped or meandering. The contact conductors run essentially in a direction perpendicular to the heating conductors.

In this type of seat heater the contact strips must conduct a great amount of power relative to the heating conductors, so that these get overheated, which represents a drawback.

This problem is solved in the known surface heating elements in that the contact strips consist of copper or copper alloys, i.e. metals showing high conductance values.

A further problem associated with such seat heaters are the high mechanical loads arising in the seat, which may lead to breakage of parts of the contact strip or breakage of whole contact strips. Partial breakage of the contact strips results in cross-sectional size reductions and thus to lower conductance values on the contact strip in the area of the breakage point. As for the current, this leads to high power losses at the point of breakage and thus overheated locations.

To solve these problems, the conductors were given a wave-like layout, which is described in DE 4101290 C2. Use was also made of core/coat wires, the core of which consists of copper or a copper alloy, and the coating of which comprises steel, or vice versa. Such types of heating elements are known from DE 10206336 A1. Solutions with multiple feeds of the contact conductors are also known All of these embodiments are still subject to the risk of breakage of the contact strip together with extreme wrinkling. Especially the technique to sew such a planar heating element into the seat cover entails the risk of wrinkling on the cover and heating element due to the vicinity of the heating element relative to the seat surface and thus also wrinkling and breakage of the contact strip, also in the above-indicated variants.

SUMMARY OF THE INVENTION

It is therefore an object of the present invention to provide a contact strip which despite a great mechanical load and high electric currents reduces the risk of breakage to such an extent that said surface heating elements can be used between the cover and the seat core and also in the cover, without creating the risk of overheating or even fire.

This object is achieved by a flexible surface heating element, particularly for seat heaters, comprising a heating field of conductive fibers electrically connected to at least one contact strip, the flexible surface heating element being characterized in that the at least one contact strip contains a portion of conductors in the form of steel filaments and a portion of conductors in the form of filaments of a higher conductivity than that of the steel filaments, the two types of conductors being electrically interconnected and held by means of textile and/or metallic yarns on a textile band, the conductors of higher conductivity extending above and/or under the steel conductors and being electrically connected to said conductors.

According to the method this object is achieved by a method for producing a flexible surface heating element, particularly a flexible surface heating element for seat heaters, comprising a heating field of conductive fibers, particularly carbon fibers electrically connected to at least one contact strip, the method comprising the following steps: providing a carrier material made from a flexible material and applying a field of heating conductors, forming a contact strip by providing a number of conductors in the form of steel filaments and a number of conductors in the form of filaments of a higher conductivity than that of the steel filaments, bundling the respective types of conductors into conductor bundles, applying the steel conductors and the conductors of higher conductivity to a textile band, the steel conductors being essentially oriented in the direction of the band, and the conductors of higher conductivity being arranged to cross the individual steel conductors, the conductors being fixed to the textile band by means of a yarn, and applying the band-like contact strip to the heating field such that the conductors of the contact strip contact the heating conductors.

DE 4312622 already discloses that electric conductors of steel are widely used in seat heaters. Especially thin single filaments and a great number of single conductors withstand high loads when used as heating conductors and are for instance obtainable in the stainless steel variant up to a filament diameter of 8 micrometers. Such steel filament conductors, however, are as such not useable because of the low conductivity of the steel as contact strip for surface heating elements for seat heaters.

It is only in combination with a second conductor type of higher conductivity that these can be used in the contact conductor, the arrangement of the two types of conductors and their interconnection playing a decisive role.

The fact is here exploited that the function of the contact strip is also fully ensured when the conductor of higher conductivity is interrupted at one or several point(s). At these points of interruption solely the steel conductors contribute to current conduction. Due to the very short portion, which is each time delimited by the ends of the conductors of higher conductivity, the power loss created at the point of interruption is so small that fire or noticeable overheating of the surface can be ruled out.

The portion in which only the steel conductors receive current can be kept particularly small in that the contact strip(s) is/are made from at least one strand and preferably from a plurality of strands of steel conductors, and at the opposite side of the steel conductors at least one strand and preferably a plurality of strands of conductors of higher conductivity, which run in wave-like configuration, is/are arranged as the steel conductors so that the power loss is particularly small and overheating only reaches a level which neither leads to fire nor causes noticeable overheating of the seat surface.

The number of steel filaments that are combined into in a bundle, forming a respective conductor, may be between 20 and 2000 individual filaments. Preferably, the number should be 150 to 500 individual filaments.

The thickness of the individual steel filaments, which are combined into a bundle, is 8 μm to 15 μm. The thickness of the individual filaments of higher conductivity should be between 50 μm and 100 μm. These different thicknesses, on the one hand of the individual steel filaments and on the other hand of the filaments of higher conductivity, are due to the fact that steel filaments can be made very thin without breakage of the fibers. Preferably, the cross sections of the individual steel filaments are chosen to be at least three times smaller than the cross sections of the filaments of the conductors of higher conductivity.

Preferably, the cross sections of the individual steel filaments should be least 10 to 30 times smaller than the cross-sections of the filaments of the conductors of higher conductivity.

The conductors of higher conductivity should be wave-shaped or in a meandering form, crossing the respective steel conductors and being in contact with said conductors. This guarantees that the two types of conductors are electrically interconnected and that upon breakage of the conductors of higher conductivity the defect remains locally limited and the broken conductor ends do not move away from each other.

For anti-corrosion reasons the steel filaments should be formed by special steel filaments. By contrast, the filaments of the conductors of higher conductivity are made from copper or copper alloys on account of the conductance value of said material.

The filaments of the conductors of higher conductivity may additionally comprise an anti-corrosion layer which is preferably formed from tin, silver or nickel.

According to the method the two conductors of the contact strip are preferably incorporated into the textile band by means of a knitting technique.

For fixing the conductors to the textile band polymer yarns or polyamide yarns should be used because the textile fibers can be kept very thin and will not impede the heating conductors significantly when these rest on the contact conductors.

Particularly preferred is a procedure in which the conductors are applied to the band by means of a sewing/knitting technique. One conductor type is here incorporated in short or partial weft, and the polyester yarn(s) or the polyamide yarn(s) exclusively form(s) the loops. Such a procedure ensures that the types of conductors are prefixed relative to each other and can no longer shift relative to each other in further method steps.

To achieve high stretchability and resilience of the contact strips forming the power supplies of the flexible surface heating element, at least the conductors of a large cross-section of the contact strip should be arranged in wave-like or meandering fashion above the carrier band, the wave axis corresponding to the band direction.

Preferably, surface heating elements as have been described above are used as surface heating elements for seat heaters of vehicles, where the above-mentioned advantages are particularly noticed.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
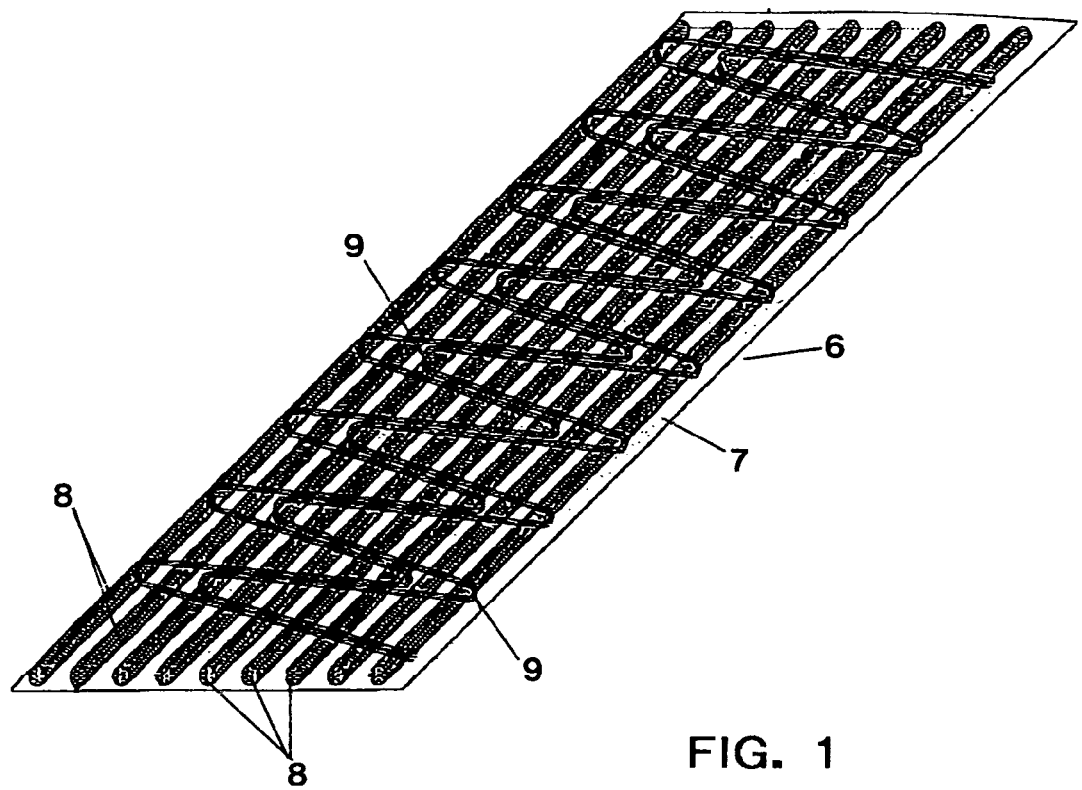
FIG. 1 is a schematic illustration of a contact strip or contact band according to the invention, the strip being used as a power supply in the surface heating element, as shown in FIG. 3.

The preferred embodiments of the present invention will now be described with reference to FIGS. 1-4 of the drawings. Identical elements in the various figures are designated with the same reference numerals.

Figure 3:
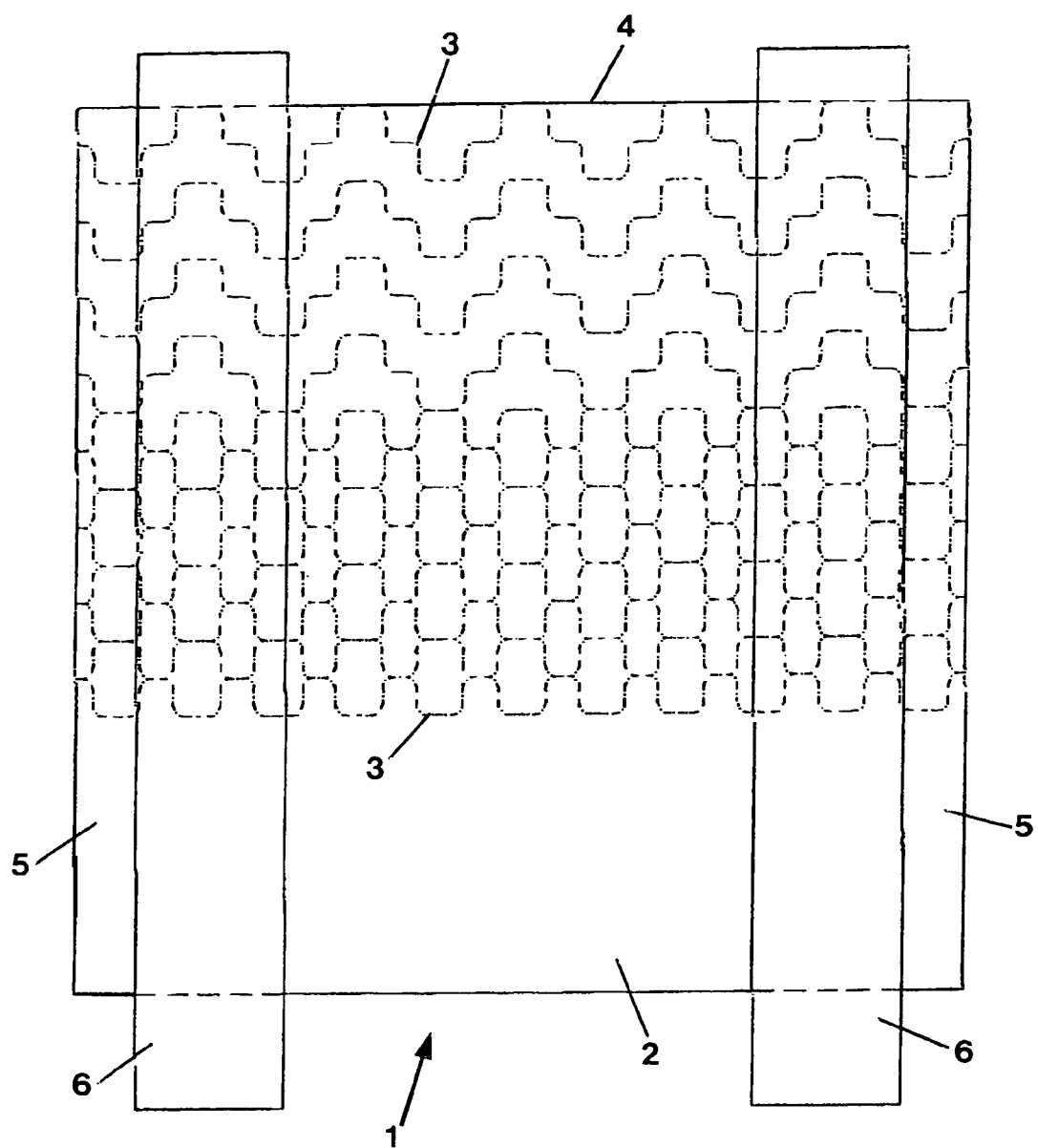
FIG. 3 shows a flexible surface heating element with schematically illustrated contact strips on both edge portions.
Figure 4:
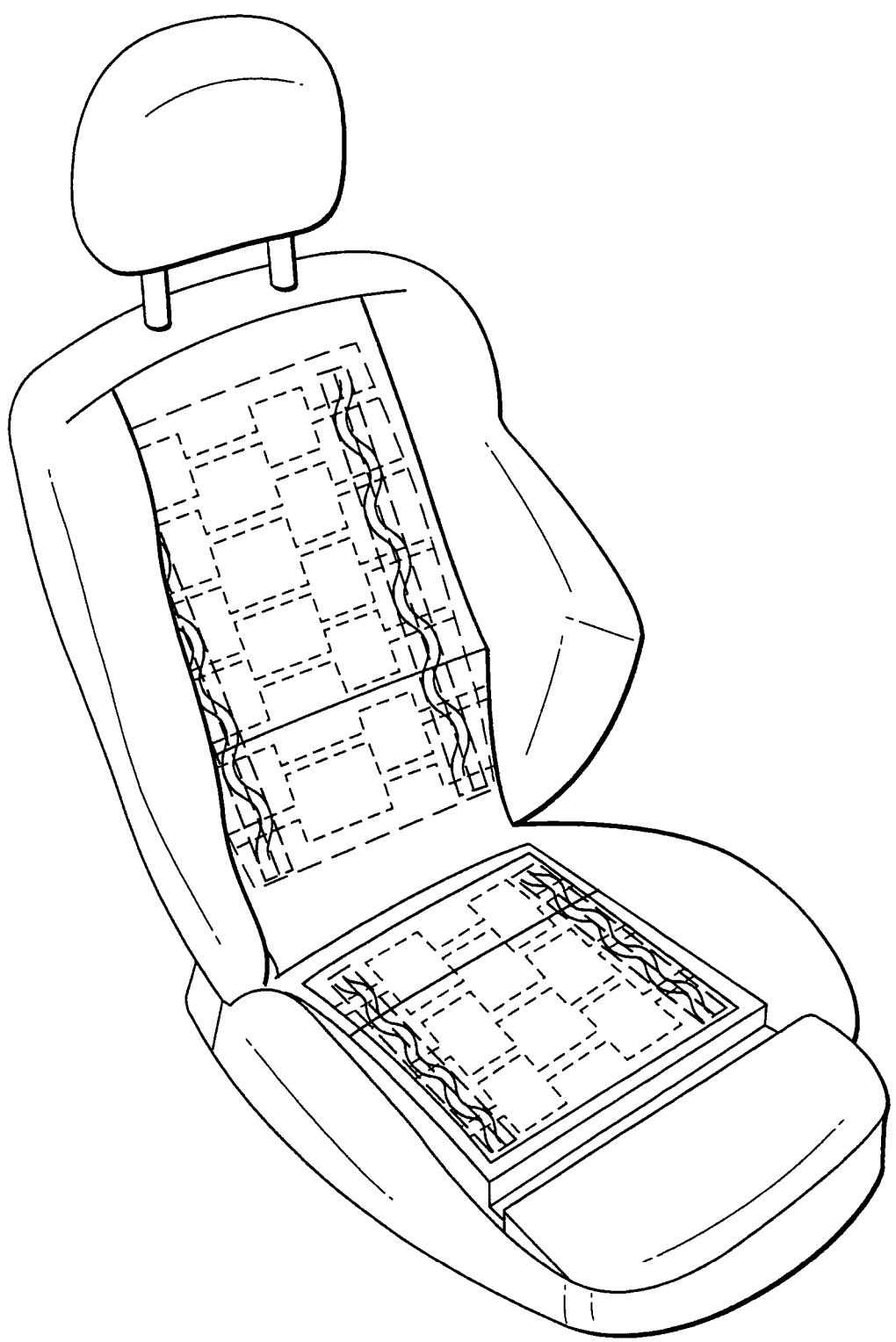
FIG. 4 shows a vehicle seat incorporating the flexible surface heating element according to the invention.

FIG. 3 shows a flexible surface heating element 1, as can for instance be sewn into the seat of a vehicle as a seat heater, as shown in FIG. 4. This surface heating element 1 comprises a textile carrier material 2 on which heating conductors 3, forming a heating field 4, are incorporated in predetermined patterns by means of a knitting technique.

Depending on the necessary heating power in the individual portions of the heating field 4, the heating conductors 3 may run at a distance closer to or further away from each other and the number of heating conductors per unit area may be enlarged or reduced, as is shown by way of example in FIG. 3 in the upper portion and in the lower portion of the heating field 4. A contact strip 6 through which the heating field is supplied with power is respectively mounted along both edge portions 5 of the heating field 4. Such a contact strip 6 is shown in its details in FIGS. 1 and 2.

Figure 2:
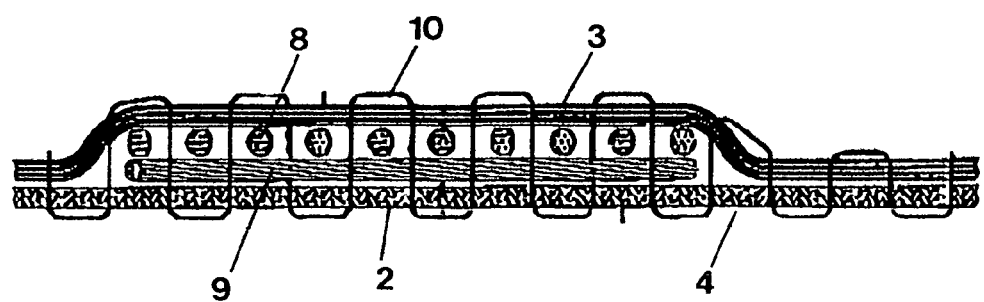
FIG. 2 is a section through the flexible surface heating element of FIG. 3 in the area of a contact strip or contact band, as shown in FIG. 1, namely in a direction transverse to the conductors extending in parallel.

As can be seen from FIGS. 1 and 2, such a contact strip 6 comprises a textile band 7 as the carrier, the band consisting e.g. of polyester or polyamide, made in a knitting technique. A plurality of conductors 8 are running in the longitudinal direction of the textile band 7, each being composed of bundles of steel filaments. Said steel filaments may have a diameter in the range of 8 µm to 30 µm. The number of the individual filaments may be between 150 and 500. Substantially in a direction transverse to the approximately parallel-oriented conductors of steel filament bundles, a second type of conductor is arranged extending in wave-like or meandering fashion, so that said conductors 9 of the second conductor type cross the steel filament conductors. Said conductors 9 of the second conductor type are formed from a material of higher conductivity when compared with the steel filament conductors 8, here again from bundles of a multitude of individual filaments. The second conductor type may encompass conductors 9 of copper or copper alloys, i.e. a material that has a higher conductivity in comparison with the steel filaments. The conductors 8, 9 of this contact strip 6 are fixed to the textile band 7 by means of a knitting technique, which is not shown in such detail in FIG. 1.

In FIG. 2, the contact strip 6, as shown in FIG. 1, is arranged in a sectional illustration on the heating field 4. In contrast to the contact strip 6 of FIG. 1, however, the conductors of higher conductivity that are running in wave-like or meandering fashion are positioned below the steel conductors 8, i.e. the contact strip as used in FIG. 2 is turned in comparison with the illustration of FIG. 1. As can be seen from FIG. 2, the contact strip with the textile band and the heating field 4 with its textile carrier material 2 and the heating conductors 3 is knitted into a composite assembly through a textile loop-forming yarn 10 by means of a sewing technique and/or a knitting technique.

To produce a surface heating element 1, as shown in FIG. 3, the contact strips 6 are first produced in the form of the textile bands 7 having the two types of conductors 8 and 9, said contact strip 6 is then glued with the bottom side of the textile band 7 to the textile carrier material 2 for the heating field 5 and is thereby fixed, the heating conductors 3 of the heating field 4, which are preferably made from carbon fibers, are subsequently applied in that they are placed in predetermined patterns on the carrier material 2 and sewed thereto, and the contact strip 6, which was first only fixed to the carrier material, is simultaneously incorporated into the textile carrier material 2 by means of the knitting technique.

It is evident that this surface heating element, as shown in the figures, is very flexible and resilient, namely not only in the area of the heating field 4, but also in the area of the contact strips 6. Moreover, the two different types of conductors, i.e. on the one hand the steel conductors 8 and on the other hand the conductors 9 of higher conductivity than the steel conductors, in the present example of conductors of copper or copper wires, ensure that a highly conductive contact band is formed that is suited for high bending cycles. Finally, the structure of the conductors 8 and 9 made from a great number of very thin single filaments yields a band that is soft and can hardly be seen on the cover surface.

There has thus been shown and described a method for flexible surface heating element, particularly for seat heaters, and method for producing a flexible heating element which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention, which is to be limited only by the claims which follow.

The invention claimed is:

1. A flexible surface heating element comprising a heating field of conductive fibers electrically connected to at least one contact strip, the improvement wherein said at least one contact strip includes a first type of conductors in the form of steel filaments and a second type of conductors in the form of filaments of a higher conductivity including one of copper and copper alloys than that of the steel filaments, the two types of conductors being electrically interconnected and affixed by means of a yarn on a textile band, the conductors of higher conductivity extending at least one of (1) above and (2) under the steel filament conductors and being electrically connected to the steel filament conductors, wherein the steel filament conductors extend substantially linearly; wherein the conductors of higher conductivity extend in meandering fashion, crossing the respective steel filament conductors and being in contact with said steel filament conductors and wherein said contact strip, formed from a textile band and said first and second types of conductors affixed thereto, is disposed adjacent to the heating field of conductive fibers.

2. The flexible surface heating element according to claim 1, wherein individual steel filaments of the steel filament conductors are combined to form a bundle.

3. The flexible surface heating element according to claim 2, wherein individual conductors of the higher conductivity are formed from a plurality of filaments combined to form a bundle.

4. The flexible surface heating element according to claim 2, wherein each bundle of the steel filaments of the respective steel filament conductors is formed from 20 to 2000 individual filaments.

5. The flexible surface heating element according to claim 4, wherein the bundle of the steel filaments of the respective steel filament conductors is formed from 150 to 500 individual filaments.

6. The flexible surface heating element according to claim 3, wherein the bundle of filaments of the respective conductors with the higher conductivity is formed from 20 to 500 individual filaments.

7. The flexible surface heating element according to claim 1, wherein the thickness of the individual steel filaments is in the range of 8 µm to 15 µm.

8. The flexible surface heating element according to claim 1, wherein the thickness of the individual filaments of the higher conductivity is about 50 µm.

9. The flexible surface heating element according to claim 1, wherein the cross sections of the individual steel filaments are at least three times smaller than the cross sections of the filaments of the conductors of higher conductivity.

10. The flexible surface heating element according to claim 9, wherein the cross-sections of the individual steel filaments of the steel filament conductors are in the range of at least 10 to 30 times smaller than the cross sections of the filaments of the conductors of higher conductivity.

11. The flexible surface heating element according to claim 1, wherein only one of (a) the steel filament conductors and (b) the conductors of higher conductivity are electrically connected to conductive fibers of the heating field.

12. The flexible surface heating element according to claim 1, wherein the steel filaments are formed by stainless steel filaments.

13. The flexible surface heating element according to claim 1, wherein the filaments of the conductors of higher conductivity additionally comprise an anti-corrosion layer.

14. The flexible surface heating element according to claim 13, wherein the anti-corrosion layer is made from a material selected from the group consisting of tin, silver and nickel.

15. A method for producing a flexible surface heating element, the method comprising the following steps:
providing a carrier material made from a flexible material and applying a field of heating conductors,
forming a contact strip by providing a number of conductors in the form of steel filaments and a number of conductors in the form of filaments of a higher conductivity including one of copper and copper alloys than that of the steel filaments, bundling the respective types of conductors into conductor bundles, applying the steel filament conductors and the conductors of higher conductivity to a textile band, the steel filament conductors being essentially oriented in the direction of the band and extending substantially linearly, and the conductors, of higher conductivity being arranged in a meandering fashion so as to cross the individual, respective, steel filament conductors, the conductors being fixed to the textile band by means of a yarn, and
applying the contact strip to the heating field such that conductors of the contact strip contact the heating conductors.

16. The method according to claim 15, wherein the two types of conductors of the contact strip are incorporated into the textile band by means of a knitting technique.

17. The method according to claim 15, wherein polyester yarns or polyamide yarns are used for fixing the conductors to the textile band.

18. The method according to claim 17, wherein the conductors are applied by means of a sewing/knitting technique to the band, at least one type of conductor being incorporated by short or partial weft and one of a polyester yarn and a polyamide yarn exclusively forming loops.

19. A surface heating element for the seat heater of a vehicle seat comprising a flexible heating element according to claim 1.

* * * * *